United States Patent [19]
Schnurmann et al.

[11] 3,753,226
[45] Aug. 14, 1973

[54] MONITORING SYSTEM
[75] Inventors: Rudolf Schnurmann; Klaus Brandts, Korschenbroich, both of Germany
[73] Assignee: Scheidt & Bachmann GmbH, Rheydt, Germany
[22] Filed: Nov. 23, 1971
[21] Appl. No.: 201,451

[52] U.S. Cl. ..... 340/146.1 C, 235/153 AC, 340/336
[51] Int. Cl. ..................... G08b 21/00, G08b 29/00
[58] Field of Search ........................... 235/153 AC; 340/146.1 C, 336

[56] References Cited
UNITED STATES PATENTS
3,626,367  12/1971  Howard...................... 340/336 UX Primary Examiner—Charles E. Atkinson
Assistant Examiner—R. Stephen Dildine, Jr.
Attorney—Walter Becker

[57] ABSTRACT

A monitoring system for the electric control of seven-element number indications in which a decoder supplied with binary number signals supplies the seven signals for the seven-element number indications. The monitoring system operates by feeding the signal for numeral 1 into the control and detects the signals to and from the decoder and if correct automatically supplies the signal for numeral 2 and again detects the signals to and from the decoder, and if the signals are again correct provides an indication that the control is functioning properly. If the control fails to operate correctly, an indication to that effect is given.

9 Claims, 4 Drawing Figures

Patented Aug. 14, 1973 3,753,226

| | m-out-code | | | | | | | BCD code | | | |
|---|---|---|---|---|---|---|---|---|---|---|---|
| | a | b | c | d | e | f | g | A | B | C | D |
| 0 | 0 | 0 | 0 | 0 | 0 | 0 | 1 | 0 | 0 | 0 | 0 |
| 1 | 1 | 0 | 0 | 1 | 1 | 1 | 1 | 1 | 0 | 0 | 0 |
| 2 | 0 | 0 | 1 | 0 | 0 | 1 | 0 | 0 | 1 | 0 | 0 |
| 3 | 0 | 0 | 0 | 0 | 1 | 1 | 0 | 1 | 1 | 0 | 0 |
| 4 | 1 | 0 | 0 | 1 | 1 | 0 | 0 | 0 | 0 | 1 | 0 |
| 5 | 0 | 1 | 0 | 0 | 1 | 0 | 0 | 1 | 0 | 1 | 0 |
| 6 | 1 | 1 | 0 | 0 | 0 | 0 | 0 | 0 | 1 | 1 | 0 |
| 7 | 0 | 0 | 0 | 1 | 1 | 1 | 1 | 1 | 1 | 1 | 0 |
| 8 | 0 | 0 | 0 | 0 | 0 | 0 | 0 | 0 | 0 | 0 | 1 |
| 9 | 0 | 0 | 0 | 1 | 1 | 0 | 0 | 1 | 0 | 0 | 1 |

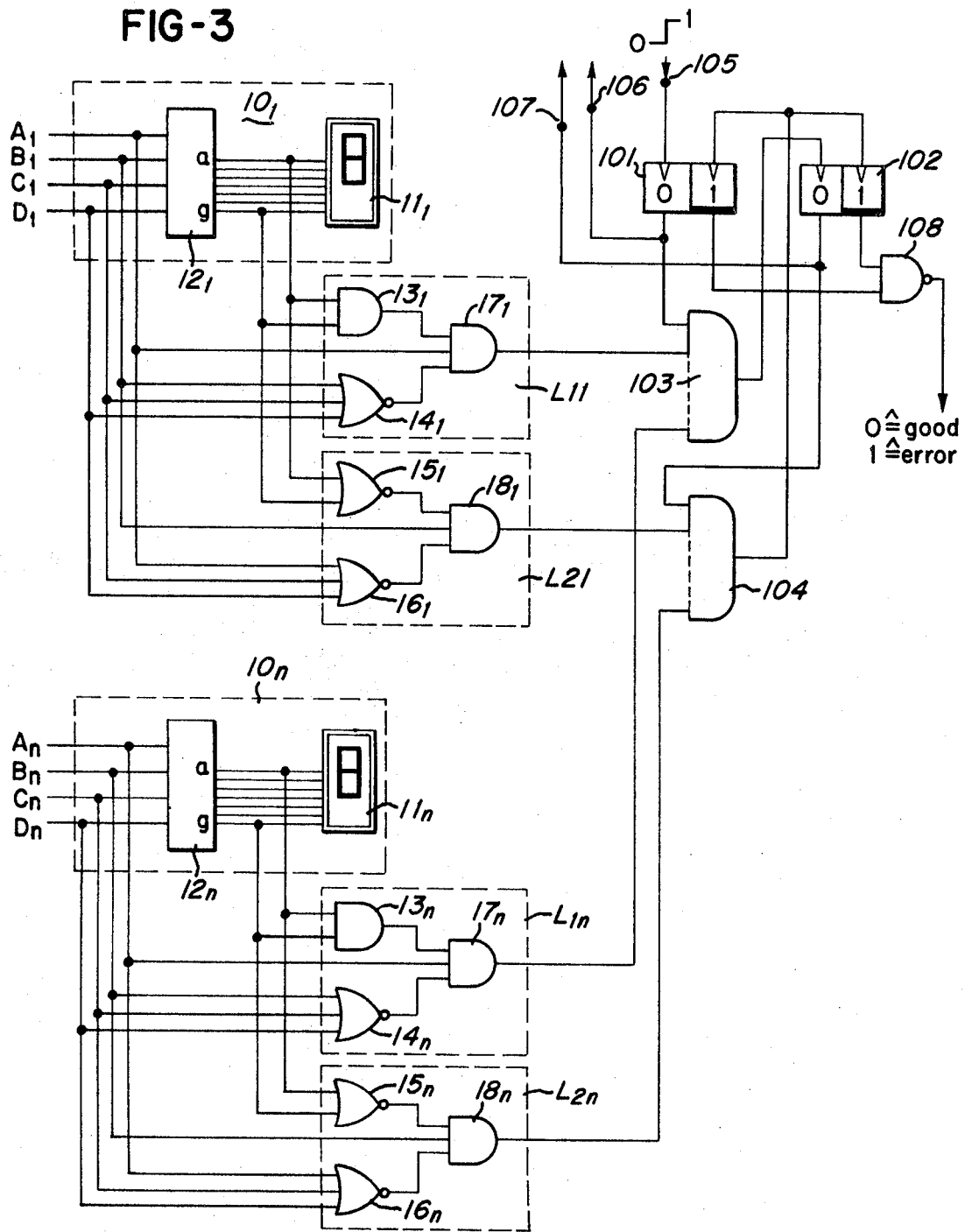

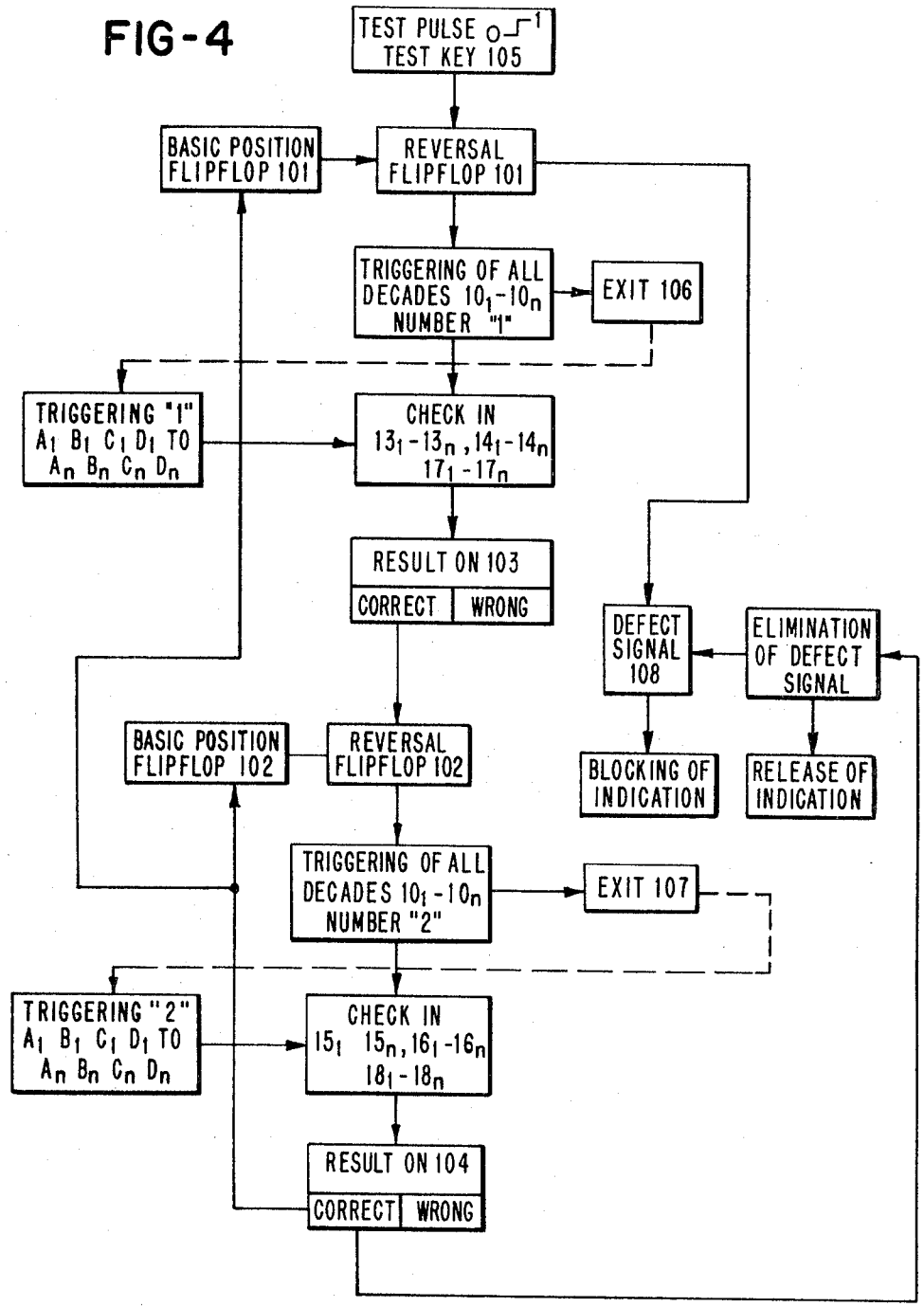

MONITORING SYSTEM

The present invention relates to an apparatus for checking the function of an electrical control of seven-element number indications in which each number is formed by from two to seven illuminated beams.

These seven-element number indications have the drawback that wrong numbers are indicated when certain beams are not illuminated or turned on in view of a defect in the electrical control or in view of such defect being illuminated by error.

It is, therefore, an object of the present invention to provide an apparatus for monitoring the function of the electric control of seven-element number indications, according to which in case of an error in the electrical control, the use of the indicating device will be prevented.

These and other objects and advantages of the invention will appear more clearly from the following specification, in connection with the accompanying drawings, in which:

FIG. 3 is a diagram of an embodiment of the checking circuit according to the invention.

FIG. 4 is a simplified block diagram of the course of function of the diagram according to FIG. 3.

Figures 1, 2:
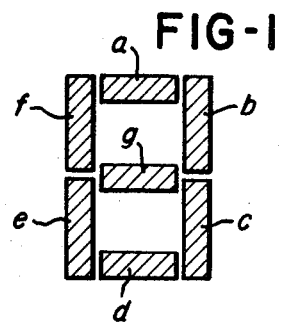
FIG. 1 shows the composition of a seven-element number indication according to the present invention.
FIG. 2 shows the code employed for controlling the seven-element number indication of FIG. 1.

The apparatus according to the present invention for monitoring the function of the electric control of seven-element number indications is characterized primarily in that the upper and intermediate transverse beams of each indicating element are checked by means of an electronic control arrangement prior to each use of the indicating device and successively as to its ability to be turned off and turned on. This check as to the ability of the upper and medium transverse beams to be turned off and on is, in conformity with a further feature of the invention, effected by a short and successive turning on of the numbers 1 and 2.

By checking the upper and intermediate transverse beam of the number indication comprising a total of seven beams, prior to each use of the indicating device, it will be prevented that an exchange of the numbers 1 and 7, 4 and 9, and 0 and 8, can be effected. With these numbers, a failure or an additional turning on of a single beam of the indicating element comprising seven beams, and more specifically, of the upper or medium transverse beam, results in an incorrect number indication, whereas the faulty control of one or more other beams brings about unequivocally optically recognizable errors.

Referring now to the drawings in detail, the seven-elements number indication is, in conformity with FIG. 1, composed of the beams a,b,c,d,e,f and g and preferably is employed with further number indications of the same type as indicating device for any desired instruments in which a measurement and registration occurs. These instruments offer to the indicating device for each decade the values to be indicated in the form of a binary code. The right-hand column of FIG. 2 shows the BCD code employed customarily, which by means of a decoding stage preceding each indicating element is transformed into $m - $ out $- 7 - $ code illustrated in the left-hand column of FIG. 2.

FIG. 3 shows a preferred embodiment of a control circuit for an indicating device according to the invention with a plurality of decades $10_l$ to $10_n$. Each decade $10_l$, $10_n$ comprises a number indication $11_l$ to $11_n$ and a preceding decoding stage $12_l$, $12_n$ and entries $A_l$, $B_l$, $C_l$, $D_l$ and $A_n$, $B_n$, $C_n$, $D_n$ for the BCD code. Of the connecting lines extending between each decoding stage $12_l$, $12_n$ and the pertaining number indication $11_l$ to $11n$ for m - out - 7 - code, the lines or conductors for the upper transverse beam a and the intermediate transverse beam g are tapped and together with the taps of the entries to the decoding stages $12_l$ to $12_n$ are on the entries side connected with logical configurations $L_{ll}$ to $L_{ln}$ and $L_{2l}$ to $L_{2n}$. Each of the logical configurations $L_{ll}$ to $L_{ln}$ consists of a and-gates $13_l$ to $13_n$, and inverted or-gate $14_l$ to $14_n$ and an and-gate $17_l$ to $17_n$ following said two gates. Each logical configuration $L_{2l}$ to $L_{2n}$ consists of two inverted or-gates $15_l$ to $15_n$, and $16_l$ to $16_n$ and an and-gate $18_l$ to $18_n$ preceding said last mentioned inverted or-gates. The exit of the and-gates $17_l$ to $17_n$ lead to an and-gate 103, whereas the exits of the and-gates $18_l$ to $18_n$ are connected to an and-gate 104.

The circuit according to FIG. 3 concerns two further bistable flipflops 101 and 102 which, in their turn, are connected to the and-gates 103 and 104 and an inverted and-gate 108. The flipflops 101 is controlled by a checking key 105 and has an exit 106 for controlling the number 1 for all digits of the multi-digit indicating device. The flipflops 102, in its turn, has an exit 107 leading to the control of the numbers 2 of all digits of the multi-digit indicating device.

From the simplified block diagram of FIG. 4 for the course of function of the circuit of FIG. 3, it will be seen that the checking pulse entered by the checking key 105 initiates the turning on of the number 1 in all number indications $11_l$ to $11_n$. When this turning on occurs free from disorders, automatically a shiftover of the number indications $11_l$ to $11_n$ to the number 2 occurs. If also this control is free from disorders, the positive checking result eliminates the defect announcement which was initiated by the depression of the checking key 105, so that now the indicating device is released. This release will not occur if during a check of the control with regard to the numbers 1 or 2 an error has been ascertained.

It is, of course, to be understood that the present invention is, by no means, limited to the specific showing in the drawings, but also comprises any modifications within the scope of the appended claims.

What is claimed is:

1. In an apparatus for monitoring the function of the electrical control of seven-element number indications in which each number is formed of from two to seven illuminated beams; an improvement therein which comprises first means for each number including seven terminals connected to supply signals for illuminating the said beams for the respective number, one second means for each monitoring control of indications connected to a selected pair of the said terminals for each number and sensitive to the signals supplied to said terminals, third means connected to said second means and responsive jointly thereto for short-time brief and successive turning-on of respective indications one and two and operable to supply signals indicating the condition of operation of said electrical control, whereby the upper and intermediate transverse beams of each number indication are checked prior to each use of the indications to determine whether said upper and intermediate transverse beams can be turned on or off.

2. An apparatus according to claim 1 in which said second means comprises gate means operable to develop a signal in response to signals on the said terminals to which the gate means is connected.

3. An apparatus according to claim 1 in which each said first means includes decoder means having on the output side the seven output terminals pertaining to the respective number and having on the input side four input terminals for receiving signals corresponding to four element number indications and which are converted in the decoder into signals corresponding to said seven-element number indications and supplied to said output terminals, said second means including first gate means connected to receive signals from said selected pair of input terminals and said output terminals of each said decoder, a plurality of second gate means each connected to receive signals from the first gate means, and third gate means each connected to receive signals from a plurality of said second gate means.

4. An apparatus according to claim 3 in which said first gate means includes a first "and" gate having inputs connected to the pair of said output terminals of each decoder to which signals are supplied for the numeral 1, a first inverted "or" gate having inputs connected to the input terminals of each decoder which are at 0 for the numeral 1, said second gate means for each decoder comprising a first further "and" gate having inputs connected to the outputs of the said first "and" and first inverted "or" gates and to the input terminal of the said decoder to which a signal is supplied for the numeral 1, said third gate means comprising a first multiple input "and" gate having the inputs connected to the outputs of said second gate means.

5. An apparatus according to claim 4 in which said first gate means for each decoder comprises a second inverted "or" gate having inputs connected to the inputs of the first "and" gate and a third inverted "or" gate having inputs connected to the input terminals of the respective decoder which are at 0 for the numeral 2, said second gate means for each decoder including a second further "and" gate having inputs connected to the outputs of said second "and" gate and said third inverted "or" gate and to that input terminals of the respective decoder which receives a signal for the numeral 2, said third gate means comprising a second multiple input "and" gate having inputs connected to the outputs of said second further "and" gate.

6. An apparatus according to claim 5 in which said third means includes first and second bistable flip flops each having a pair of input terminals and a pair of output terminals, one output of said first flip flop being connected to supply a signal for the numeral 1 to said electrical control and also connected to an input of said first multiple input "and" gate, one output terminal of said second flip flop being connected to supply a signal to said electrical control for the numeral 2 and also connected to an input of said second multiple input "and" gate, the output of said first multiple input "and" gate being connected to the input terminal of said second flip flop which when supplied with a signal will cause the supply of a signal to the said first output terminal thereof, selectively operable signal supply means connected to the input terminal of said first flip flop which when supplied with a signal will cause the supply of a signal to the said first output terminal thereof, said output of said second multiple input "and" gate being connected to the other input terminals of said flip flops, a signal operating inverted "and" gate having inputs connected to the other output terminals of said flip flops.

7. An apparatus according to claim 1 in which said monitoring is effected by selectively supplying a signal for the numeral 1 to said electrical control.

8. An apparatus according to claim 1 in which said selected pair of terminals are those which supply the upper and intermediate beams.

9. The method of checking the operation of the electrical control for seven-element number indications in which each number is formed of a respective combination of from two to seven electrically actuated beams, said beams including a pair which are in nonactuated condition in the indication of the numeral 1 and in actuated condition in the indication of the numeral 2, supplying a signal for the numeral 1 thereby to place said pair of beams in nonactuated condition, supplying a signal for the numeral 2 in conformity with the detection of a condition of nonactuation of both of said pairs of beams thereby to change said pair of beams to actuated condition, and supplying a signal indicating the condition of operation of said electrical control in conformity with whether or not said numeral signals have been properly processed.

\* \* \* \* \*